United States Patent [19]

Oyamatsu et al.

[11] Patent Number: 4,632,585
[45] Date of Patent: Dec. 30, 1986

[54] IMAGE FORMING APPARATUS

[75] Inventors: Yasuyuki Oyamatsu, Yokohama; Masashi Uematsu, Tokyo; Hiroshi Sakai, Yokohama, all of Japan

[73] Assignee: Kabushiki Kaisha Toshiba, Kawasaki, Japan

[21] Appl. No.: 711,484

[22] Filed: Mar. 13, 1985

[30] Foreign Application Priority Data

Mar. 14, 1984 [JP] Japan .................. 59-48608

[51] Int. Cl.⁴ ............................................. B41J 15/04
[52] U.S. Cl. ................................... 400/613; 400/120; 242/55.2
[58] Field of Search .................. 400/613, 613.1, 618, 400/692, 120, 209, 655, 660.2; 226/195; 242/55.2; 219/216

[56] References Cited

U.S. PATENT DOCUMENTS

| | | | |
|---|---|---|---|
| 438,770 | 10/1890 | Whilden | 242/55.2 X |
| 447,419 | 3/1891 | Wheeler | 242/55.2 |
| 1,239,981 | 9/1917 | Storm | 242/55.2 X |
| 1,907,993 | 5/1933 | Maxham et al. | 400/649 X |
| 3,447,657 | 6/1969 | Majors | 400/618 X |
| 3,845,850 | 11/1974 | Herr et al. | 400/613 X |
| 3,908,810 | 9/1975 | Denley | 400/613 |
| 4,027,705 | 6/1977 | Safar et al. | 226/195 X |

FOREIGN PATENT DOCUMENTS

| | | | |
|---|---|---|---|
| 0090387 | 7/1980 | Japan | 400/642 |
| 0033973 | 4/1981 | Japan | 400/613 |
| 0006780 | 1/1982 | Japan | 400/618 |
| 0064582 | 4/1982 | Japan | 400/613 |
| 0129769 | 8/1982 | Japan | 400/692 |
| 0059483 | 4/1984 | Japan | 400/613 |

Primary Examiner—Edgar S. Burr
Assistant Examiner—John A. Weresh
Attorney, Agent, or Firm—Cushman, Darby & Cushman

[57] ABSTRACT

In an image forming apparatus, a holder for holding a roll wound in a rolled state from a sheet is provided on a housing for covering a body having an image forming function.

3 Claims, 26 Drawing Figures

FIG. 17
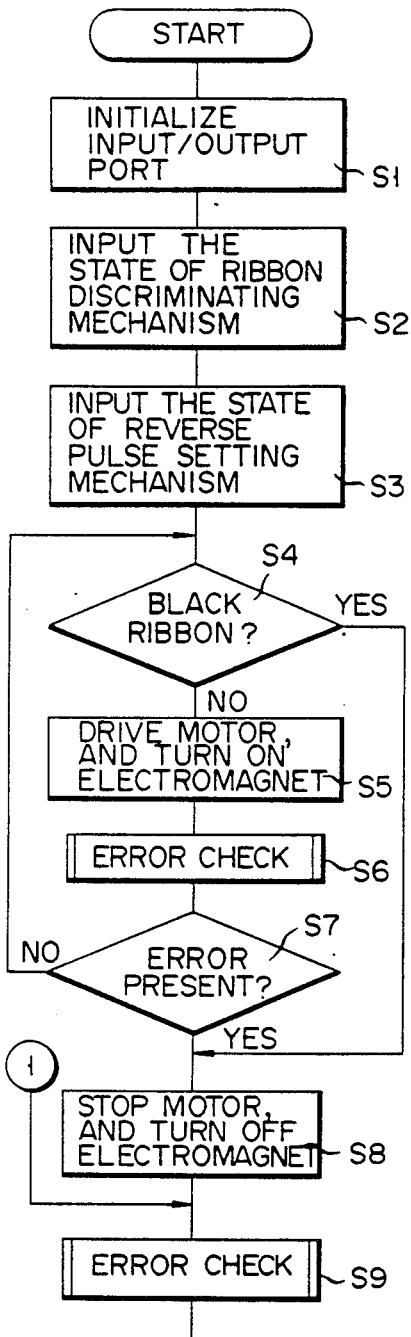
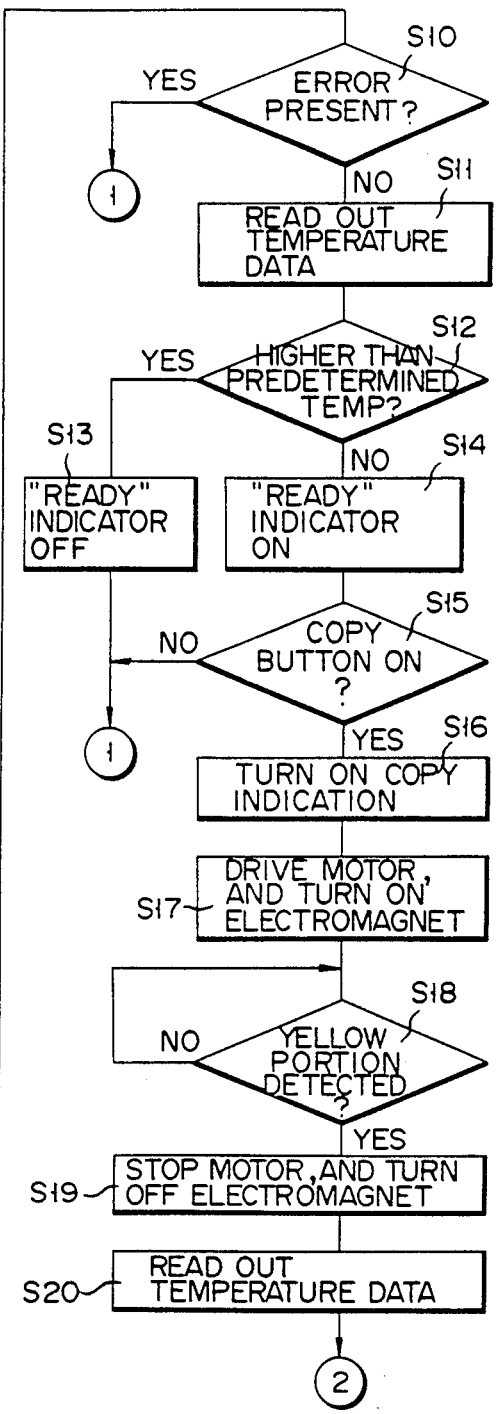

IMAGE FORMING APPARATUS

BACKGROUND OF THE INVENTION

The present invention relates to an image forming apparatus for forming an image on a sheet supplied from a sheet roll.

Among conventional image forming apparatus of this type, there are thermal transfer printing machines which print by heating a ribbon impregnated with a color agent. Generally small-sized, low-priced, noise-free, and capable of printing on ordinary paper, these printing machines have recently been used for computers, recorders for the output of word processors, and copying apparatuses.

Further, a sheet roll might be used as a sheet, to have an image printed on it in thermal transfer printing machines. However, in this case, it is considered that the sheet roll is contained in the housing of the machine, so a space for the sheet roll must be formed in the machine. Therefore, the machine must be increased in size, and the housing must be opened when mounting or exchanging the sheet roll, which is time consuming.

SUMMARY OF THE INVENTION

An object of the present invention is to provide an image forming apparatus which permits a sheet roll to be mounted, without increasing the size of the apparatus.

According to one aspect of the present invention, there is provided an image forming apparatus for forming an image on a sheet in response to an image signal comprising a body having an image forming function, a housing for covering the body, the housing having a feeding port for feeding the sheet into the body and an exhausting port for exhausting the sheet with the printed image out of the body, and a holder provided on the housing for holding the roll, wound with sheets to be supplied to the body.

BRIEF DESCRIPTION OF THE DRAWINGS

FIGS. 17 to 20 are a series of flowcharts showing the operating states of the printer shown in FIG. 1;

DETAILED DESCRIPTION OF THE PREFERRED EMBODIMENTS

One embodiment of the present invention will now be described in more detail with reference to FIGS. 1 to 20.

Figure 1:
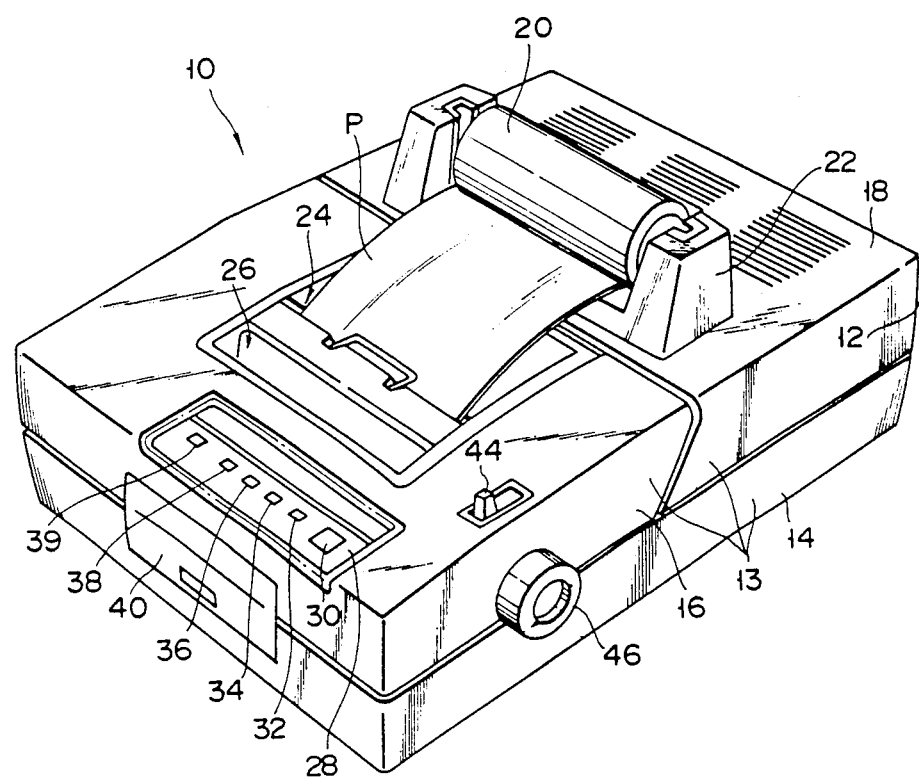
FIG. 1 and FIG. 2 are perspective views of a printer according to one embodiment of the present invention.
Figure 2:
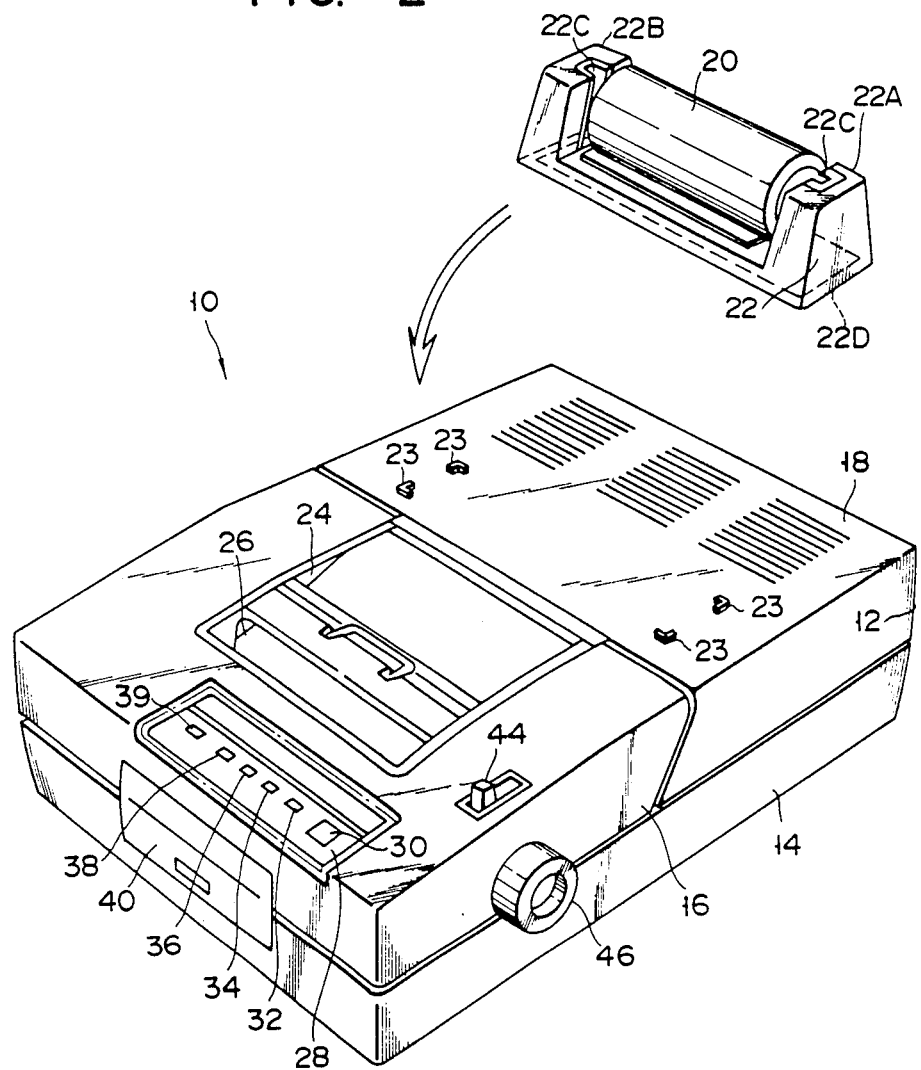

As shown in FIG. 1 and FIG. 2, in a thermal printer 10 according to the embodiment of the present invention, a housing 13 for covering a body 12 is provided. The printer 10 is separated into a lower unit 14 and an upper unit 16 openable to the lower unit 14. The unit 16 is provided on the front portion of the body 10, and the rear portion of the body 10 is formed integrally with the unit 14, as the lower unit 14. A holder 22 for mounting a roll 20, wound with paper P, is detachably mounted on the rear portion 18.

In the holder 22, supporting portions 22A and 22B, for rotatably supporting both ends of the roll at both ends of the holder 22, are extended upward to face each other. Grooves 22C, for guiding both ends of the roll 20 when mounting therein or removing it therefrom, are formed on the supporting portions 22A and 22B. The grooves 22C extend from the upper ends of the supporting portions 22A and 22B their midpoints. Further, a recess 22D (designated by a broken line in FIG. 2) is formed on the bottom of the holder 22 and four projections 23 to be engaged with the recess 22D for defining the installing position of the holder 22 are formed on the rear portion 18, integrally with the housing 13. Therefore, when the holder 22 is mounted onto the body 12, the holder 22 may be placed so that the recess 22D is engaged with the projections 23.

On the upper unit 16, an inserting port (feeding port) 24 for paper P (to be printed with an image) and an exhausting port 26 for exhausting the paper P (printed with the image) are adjacently formed at the center. A control panel or display panel 28 is disposed on the front surface of the upper unit 16. On the control panel 28 are arranged a start button 30, a power indicator 32, a no paper indicator 34, a no ribbon indicator 36 and other indicators such as, for example, a jam indicator 38, a ready (prepared) indicator 39.

A hook lever 40 for opening and closing the upper unit 16 is provided under the control panel 28. The construction of the hook lever 40 will be described in detail later.

A release lever 44 for pressing or releasing the paper P to, or from, a platen to be described later is provided adjacent to the inserting port 24 and the exhausting port 26 of the upper unit 16 to wind the paper P onto the platen (See FIG. 2). A knob 46 for operating the platen 42 is provided at the side of the unit 16.

Figure 3:
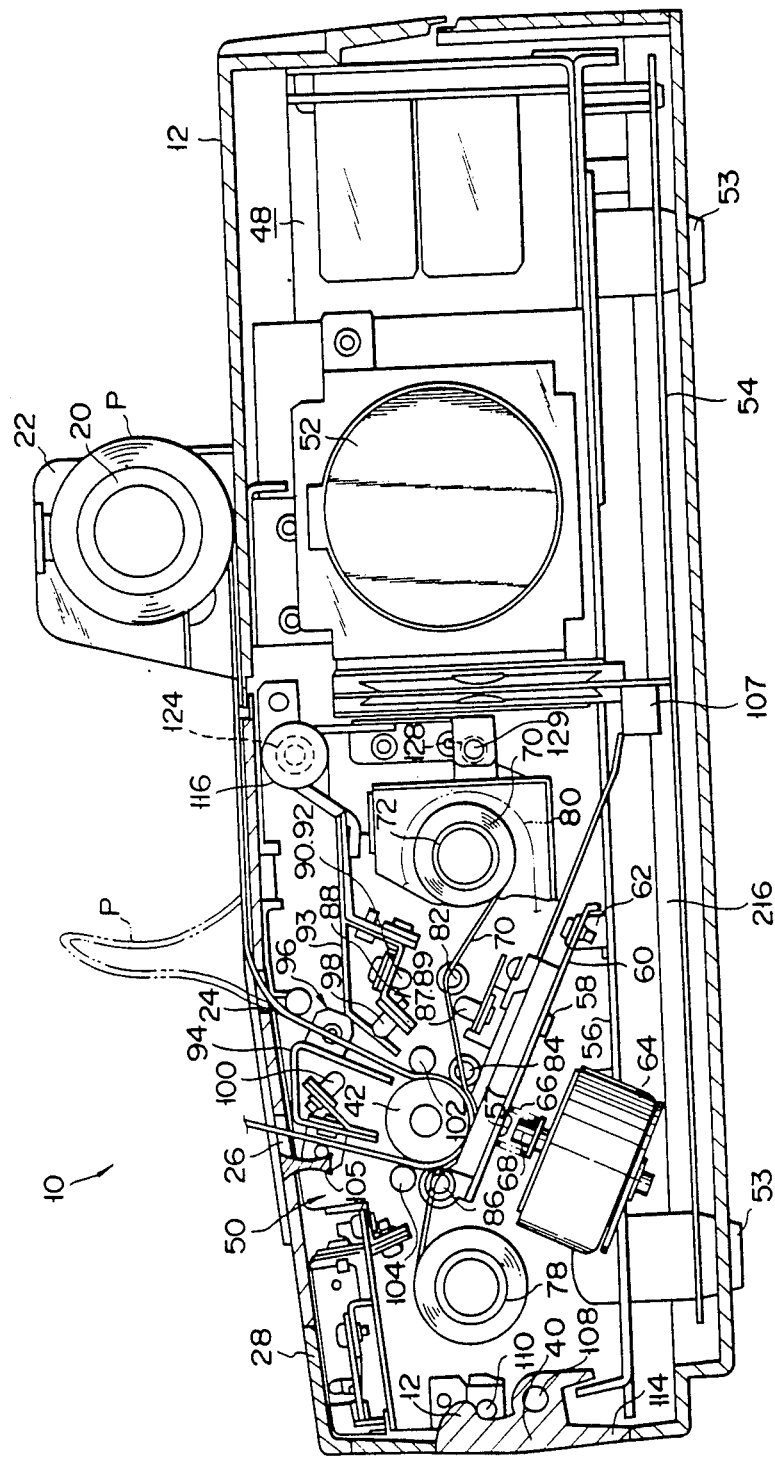
FIG. 3 is a schematic sectional view of the printer of FIG. 1.

As shown in FIG. 3, in the body 12, a power source 48 is provided in the rear portion, and an image forming unit 50 is provided in the front portion, i.e., at the upper unit 16 side. In the image forming unit, the image is printed or formed on the paper P in response to an image signal from external equipment, such as a computer. A pulse motor 52 is disposed as the drive power of the image forming unit 50 between the power source 48 and the image forming unit 50.

The power source 48 and the pulse motor 52 provided at the front side of the power source 48 are associated on a body base 54 mounted with supporting legs 53 for supporting the body 12.

The image forming unit 50 is provided with the conductive platen 42 at the center of the front portion in the body 12. A thermal head (a printing head) 56 is provided as a thermosensitive head formed with heat generators (not shown) in a line dot shape along the axial direction of the platen 42 under the platen 42. This thermal head 56 is carried on a head mounting base 58, which is mounted through a leaf spring 60 to a holder 62. The base end of the spring 60 is secured to the holder 62, and the base 58 is mounted on the free end of the spring 60. The free end of the spring 60 is elastically supported through a coil spring 66 so as to form a space between the thermal head 56 and the platen 42. A plunger 68, inside the spring 66, is projected into the electromagnet 64, and a predetermined interval is formed between the plunger 68 and the spring 60. Therefore, when the electromagnet 64 is energized, the spring 60 is pushed to the platen 42 against the urging force of the spring 66, and the head 56 is accordingly pressed to the platen 42 at the predetermined force. A temperature sensor 57 such as, for example, a thermistor for detecting the temperature around the head 56, is provided in the vicinity of the head 56.

Mounted in the image forming unit 50, is a ribbon cassette 80 containing a pair of winding cores 72, 78, wound with the ends of a transfer ribbon (transfer material) 70. The cassette 80 will be described in detail later. The ribbon 70 which moves between the platen 42 and the head 56, is guided by first, second and third ribbon guides 82, 84, 86, the platen 42 is disposed between the second ribbon guide 84 and the third ribbon guide 86, and the ribbon 70 is led to closely contact the platen 42. A ribbon detecting mechanism 88 for detecting the ribbon 70, is provided between the first ribbon guide 82 and the second ribbon guide 84, and includes a pair of light emitting elements 87, 89 provided through an interval from each other, and a pair of photoreceptor elements 90, 92 for receiving the lights from the corresponding elements 87, 89 respectively. The ribbon detecting means detects the presence of the ribbon when the light between the elements 87, 89 and 90, 92 is interrupted by the opaque portion of the ribbon 70, to be described in detail later. When no ribbon is detected by the mechanism 88, it is indicated on the no ribbon indicator 36 of the control panel 28.

Guide plates 93, 94 for guiding paper P into the image forming unit 50 and to the platen 42, form a conveying passage for the paper P above the ribbon detecting mechanism 88. A paper detecting mechanism 96, for detecting the paper P before the platen 42, is provided in the passage. The mechanism 96 includes, similarly to the ribbon detecting mechanism 88, a light emitting element 98 and a photoreceptor 100 disposed on either side of the conveying passage. Further, the mechanism 88 is connected to the no paper indicator 34 to indicate when there is no paper in the conveying passage.

A pair of press rollers 102, 104 for pressing the paper P conveyed from the conveying passage to the platen 42 and to wind the paper P onto the platen 42, are provided at either side of the platen 42. The rollers 102, 104 are constructed so that they can be removed from the platen 42 by the operation of the release lever 44 (provided on the upper surface of the upper unit 16). A releasing mechanism 106 will be described in detail later. A cutter 105 for separating the portion of the paper P with the image from the rest of the paper is provided between the press roller 104 and the exhausting port 26.

The paper P inserted into the inserting port 24, to the image forming unit 50, is pressed on one press roller 102 by the construction of the image forming unit 50, wound on the platen 42, passed through the other press roller 104, and exhausted from the exhausting port 26. The paper P is superposed on the ribbon 70 around the platen 42, thereby forming the image by the head 64. In this case, ink (color agent) is thermally transferred from the ribbon 70 to the paper P. In the case of forming a color image, after the initial color is transferred to the paper P, the paper P is returned toward the inserting port 24 as shown by a two-dotted chain line in FIG. 3. Then, the ribbon is fed, the second color is set to the portion corresponding to the head 56, and the second color is transferred while the paper P is moved forward. In this manner, three colors such as cyan, magenta and yellow are sequentially superposed and transferred to the paper.

The hook lever 40 previously described is provided on the front surface of the body 12. The lever 40 is supported so that it can rotate, at the center of a shaft 108 of the lower unit 14. A projection 112 for engaging a bar 110 secured to the upper unit 16 is formed at the upper end of the lever 40. The lever 40 is always urged by a spring (not shown) to be rotated clockwise with the shaft 108 as its center, i.e., so that the projection 112 is disposed inside the body 12. The bar 110 of the upper unit 16, engaged with the projection 112, is disengaged by pressing the lower portion of the lever 40 toward the inside of the body 12 against the urging force of the spring (not shown). When the projection 112 of the lever 40 disengages the bar 110, the upper unit 16 is opened to the lower unit 14 as shown in FIG. 4, and the image forming unit 50 is exposed.

Figure 8:
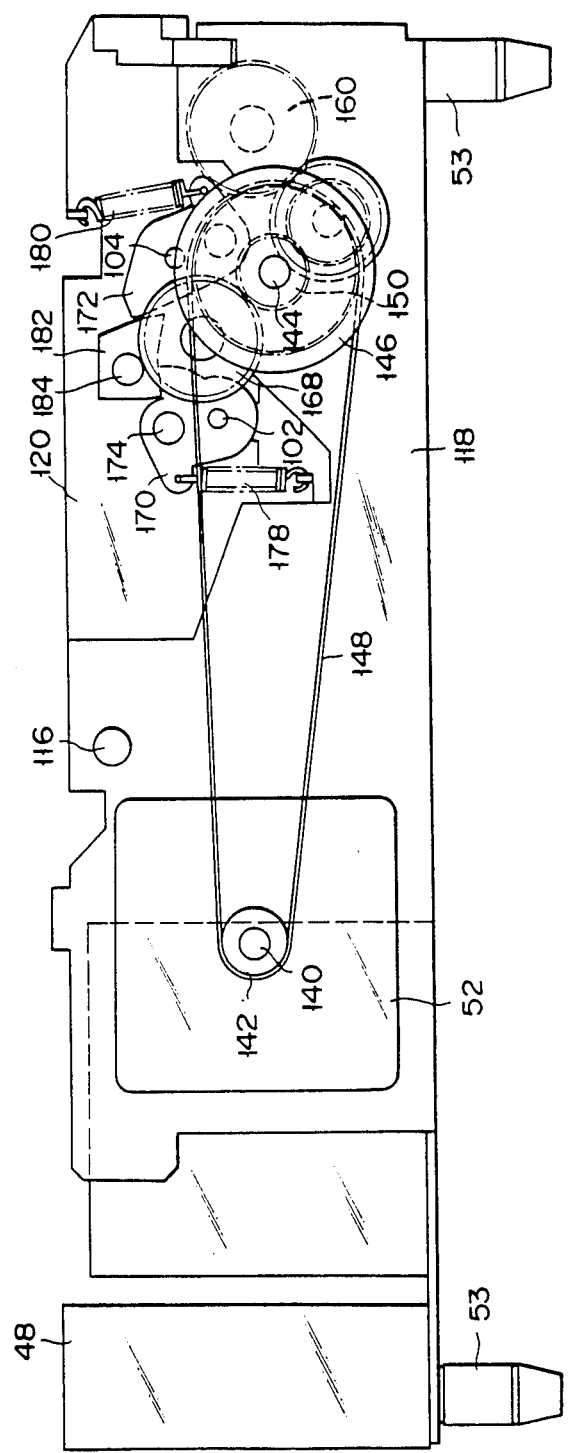
FIG. 8 and FIG. 9 are side views showing a drive power transmitting mechanism of the printer shown in FIG. 1.

The upper unit 16 and the lower unit 14 are coupled through a coupling mechanism 116 at the back of the upper unit 16 (shown in FIG. 3). This mechanism 116 rotatably couples side frames 118, provided at both sides of the lower unit 14 to side frames 120, provided at both sides of the upper unit 16 together. Parts of the components which construct the image forming unit 50 are supported by the side frames 118, 120 as shown in FIG. 8. The mechanism 116 includes a shaft 122, and a spiral spring 124 wound on the shaft 122 to open the top of the unit 16. Therefore, the unit 16 is rotatable with respect to the unit 14 as shown in FIG. 4 to FIG. 5 by the operation of the lever 40, thereby exposing the image forming unit 50.

Figure 4:
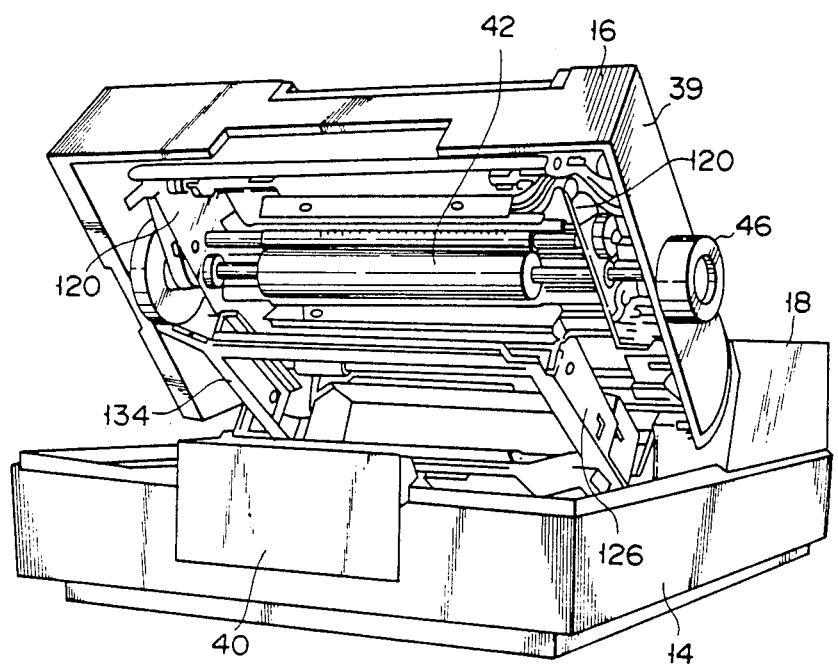
FIG. 4 is a perspective view of the printer of FIG. 1, opened so that the interior is exposed.
Figure 5:
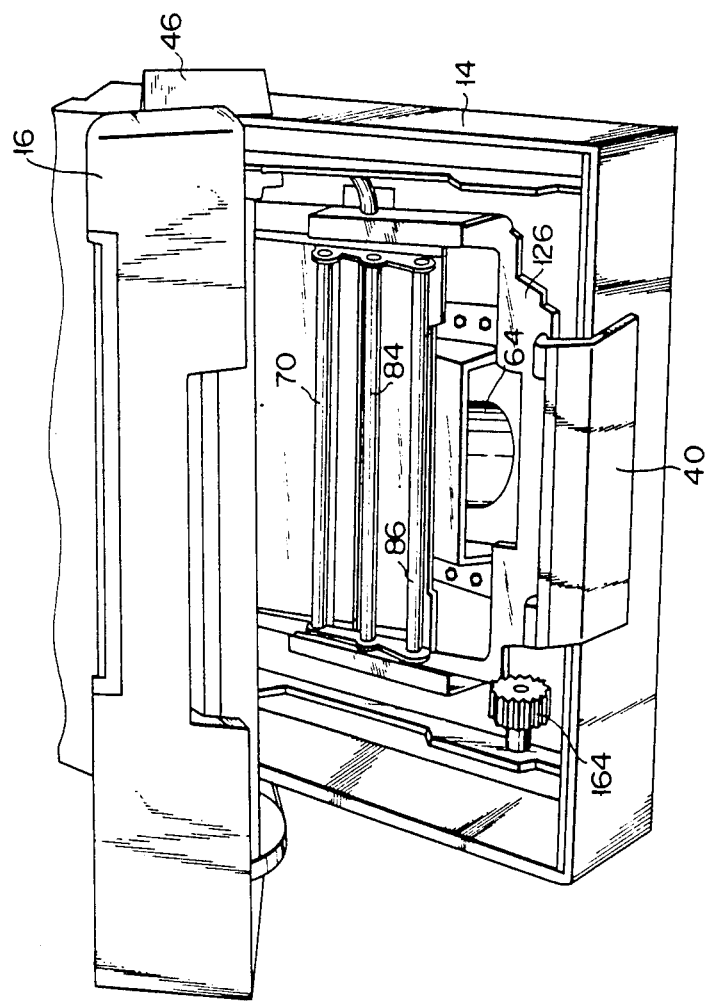
FIG. 5 is a perspective view showing the printer in the state shown in FIG. 4 from the other angle.
Figure 6:
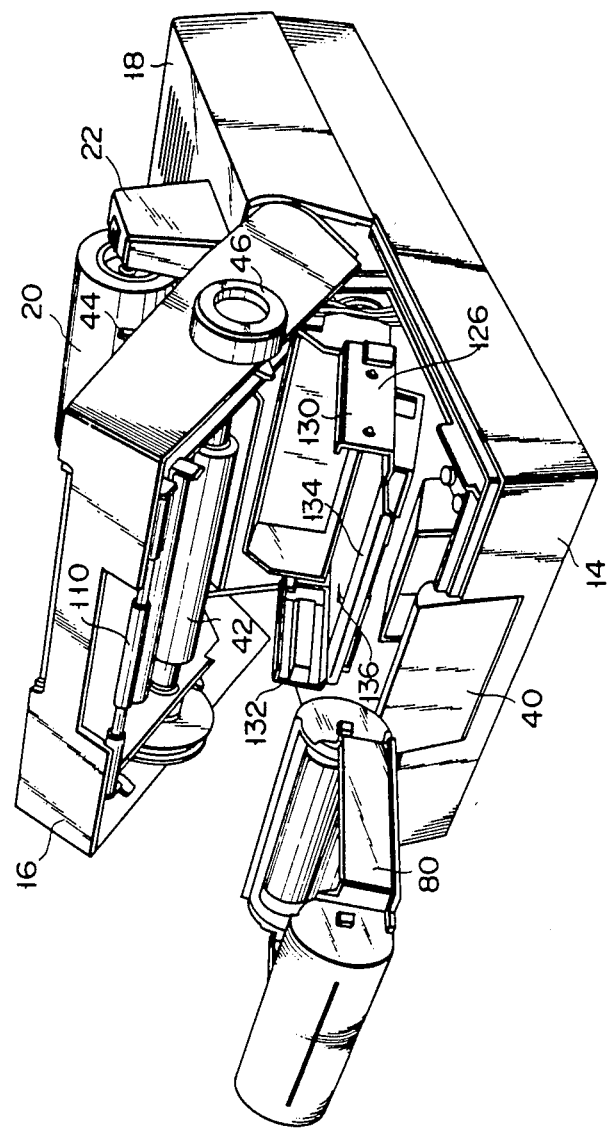
FIG. 6 is a perspective view for describing a cassette holder of the printer shown in FIG. 1 and the mounting operation of the ribbon cassette therein.
Figure 7:
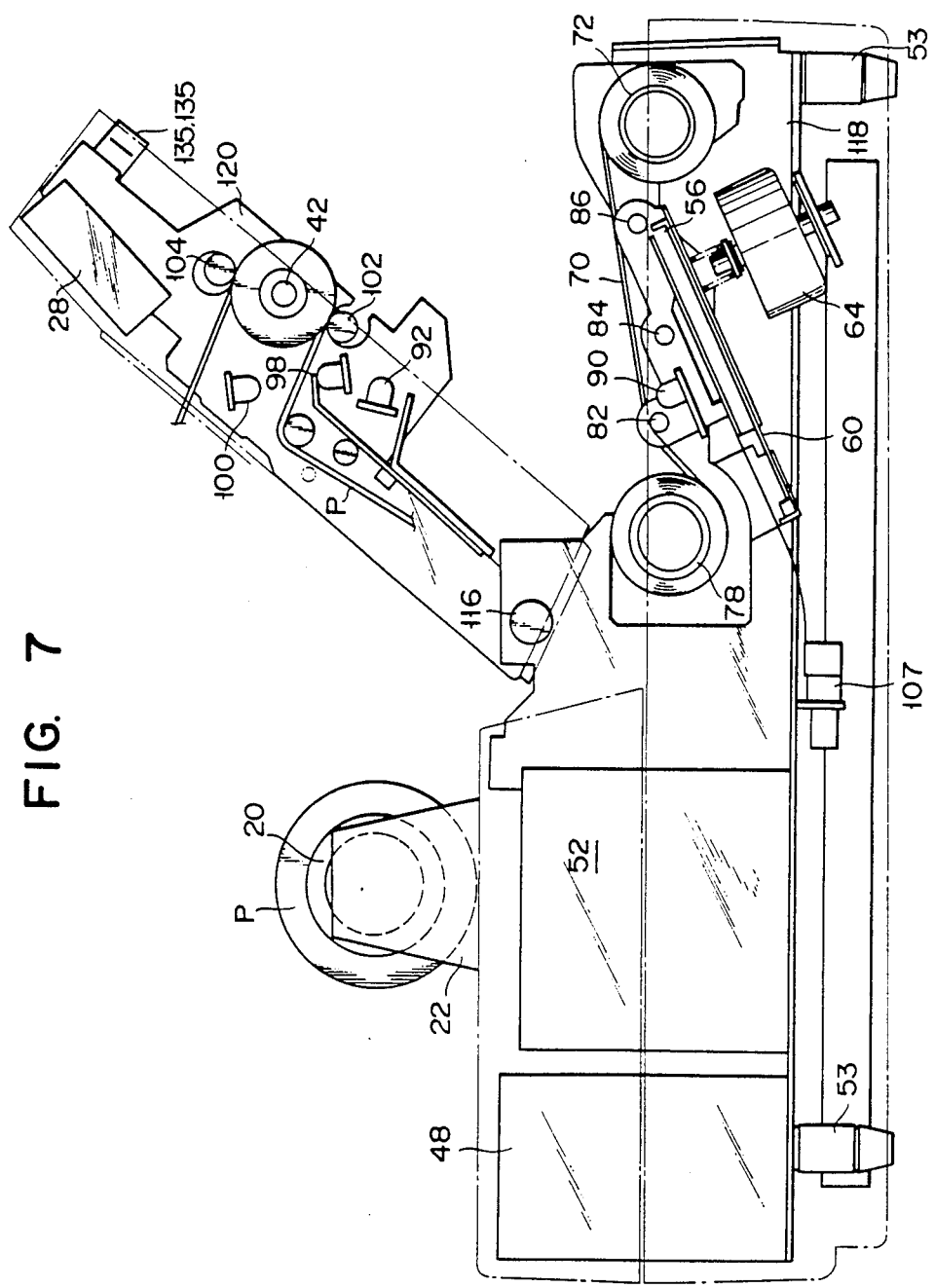
FIG. 7 is a side view schematically showing the interior of the printer in the state shown in FIG. 4.

When the upper unit 16 is opened as shown in FIG. 4 and FIG. 6, a cassette holder 126 for mounting the ribbon cassette 80 is exposed. In the holder 126, as shown in FIG. 3, the rear thereof is coupled (similarly to the coupling mechanism 116) through a spiral spring 128 and a shaft 129 to the respective frames 118, of the lower unit 14. Therefore, when the unit 16 is open, the holder 126 is disposed at the center between the lower unit 14 and the upper unit 16. The holder 126 is provided at both sides with side plates 130, 132 so that the cassette 80 can be slidably mounted from the front. A hole 136 is formed at the center of the substrate 134 of the holder 126 to expose the ribbon between the winding cores of the ribbon cassette.

Figure 9:
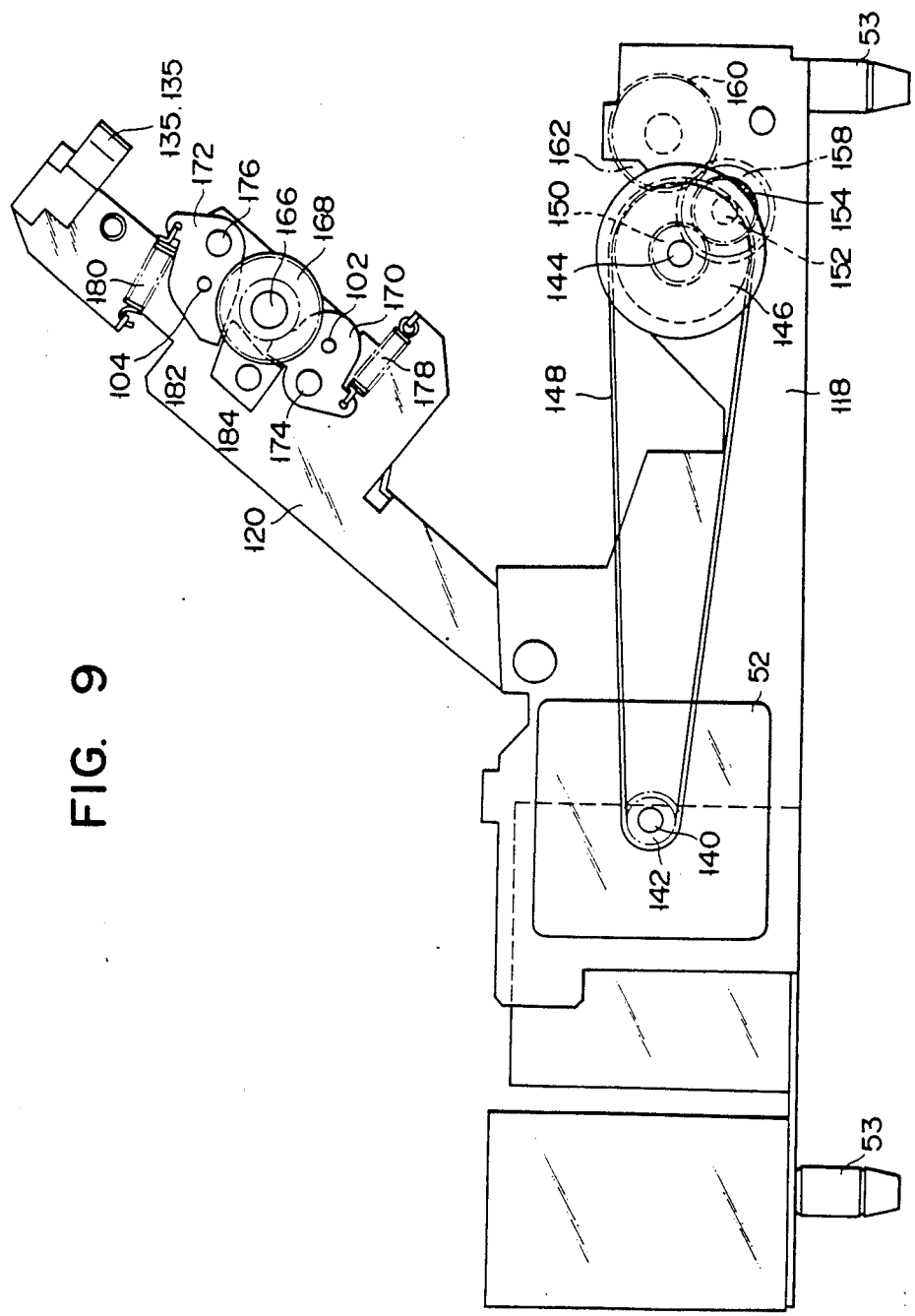

As shown in FIG. 8 and FIG. 9, positioning guide pieces 135, are downwardly projected at the front side (control panel side) of both side frames 120, of the upper unit 16. When the upper unit 16 is closed, the guide pieces 135, are disposed outside the side frames 118, of the lower unit 14 to reliably guide the upper unit 16 to the predetermined position on the lower unit 14.

A drive force transmitting mechanism 138 for transmitting the drive force of the motor 52 to a component of the image forming unit 50 such as a platen 42 will be described with reference to FIGS. 8 to 11.

An output pulley 142 is mounted on a rotational shaft 140 of the motor 52, and a (driven) pulley 146 is supported through a first rotational shaft 144 at the center of the outside of one frame 118 of the lower unit 14. A timing belt 148 is stretched between the pulley 146 and the output pulley 142. A first gear 150 is coaxially mounted on the first shaft 144. A second gear 154 mounted on a second rotational shaft 152 is meshed with the first gear 150. A third gear 158 is mounted on the second shaft 152 through a one-way clutch 156 on the inside of the frame 118. A fourth gear 162 mounted on a third rotational shaft 160 is meshed with the third gear 158. A coupling 164 (See FIG. 4) engageable with one winding core 72 of the ribbon cassette 80 through a one-way clutch 163 is mounted on the third shaft 160.

On the other hand, a fifth gear 168 is mounted on a shaft 166 of the platen 52 at the side frame 120 of the upper unit 16. This fifth gear 168 is meshed with the first gear 150 in the state that the upper unit 16 is closed, i.e., the upper unit 16 is superposed on the lower unit 14 as shown in FIG. 8.

Figure 10:
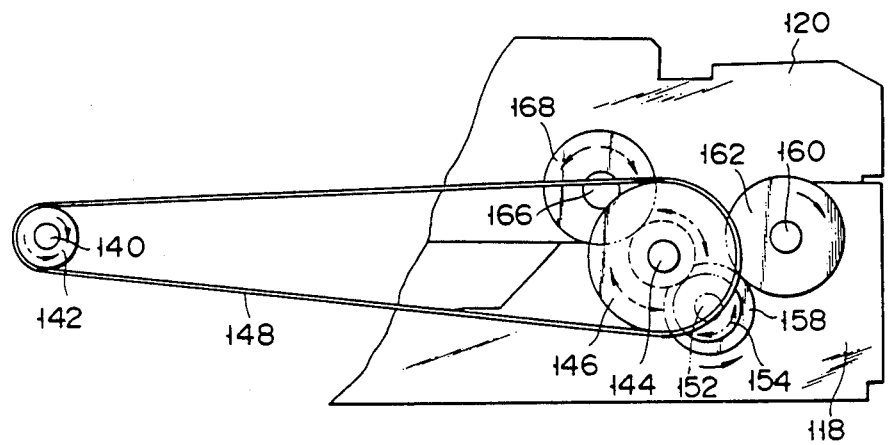
FIG. 10 is a side view showing the operation of the transmitting mechanism shown in FIG. 8.
Figure 11:
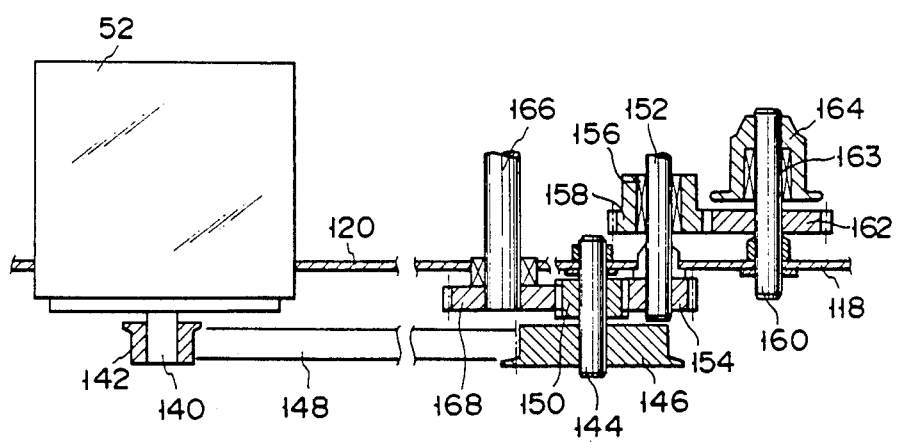
FIG. 11 is a schematic side view of the transmitting mechanism shown in FIG. 8.

When the shaft 140 of the motor 52 is driven clockwise (in the direction designated by an arrow with a solid line) as shown in FIG. 10, the drive force is sequentially transmitted through the output pulley 142, the timing belt 148 and the pulley 146 to the first shaft 144, thereby rotating the first gear 150 mounted on the first shaft 144 in the same direction.

Therefore, the shaft 166 mounted with the fifth gear 168 meshed with the first gear 150, is rotated counterclockwise (in the direction designated by an arrow with a solid line), i.e., in the direction for feeding transfer paper P.

On the other hand, the second shaft 152 is driven through the second gear 154 meshed with the first gear 150 and the rotation of the second shaft 152 is then transmitted through the clutch 156, the third gear 158, and the fourth gear 162 to the third shaft 160. The drive force of the third shaft 160 is then transmitted through the clutch 163 to the coupling 164, and the coupling 164 is driven clockwise, i.e., in the direction for winding the heat transfer ribbon 70.

When the shaft 140 of the motor 52 is rotated reversely (counterclockwise), the shaft 166 is rotated clockwise (in direction designated by an arrow with a broken line), i.e., in the direction for reversely feeding the transfer paper P, and the drive force is not transmitted through the coupling 164 via one-way clutches 156, 163. Therefore, only the paper P is reversely fed when the motor 52 is reversely rotated, and not the transfer ribbon 70.

Then, the releasing mechanism 106 will be described in more detail with reference to FIG. 9. A pair of cam levers 170, 172 are rotatably provided on shafts 174, 176 to hold the shaft 166 (of the platen 42) between the frame 120 and the fifth gear 168. The rollers 102, 104 are rotatably mounted on the levers 170, 172 respectively. Springs 178, 180 are mounted on one end of the levers 170, 172 respectively, for urging the levers 170, 172 to press the rollers 102, 104 to the platen 42. A cam lever 182 is mounted rotatably on a shaft 184 to center the other ends of the levers 170 and 172.

This cam lever 182 is coupled to the release lever 44 previously described, and rotated by the operation of the lever 44. When the lever 182 is rotated counterclockwise in FIG. 9, the levers 172, 174 are rotated against the urging forces of the springs 178, 180, with the result that the rollers 102, 104 are separated from the platen 42.

The operations of the thermal head 56 and the platen 42 will be described with reference to FIG. 12 and FIG. 13.

Figure 12:
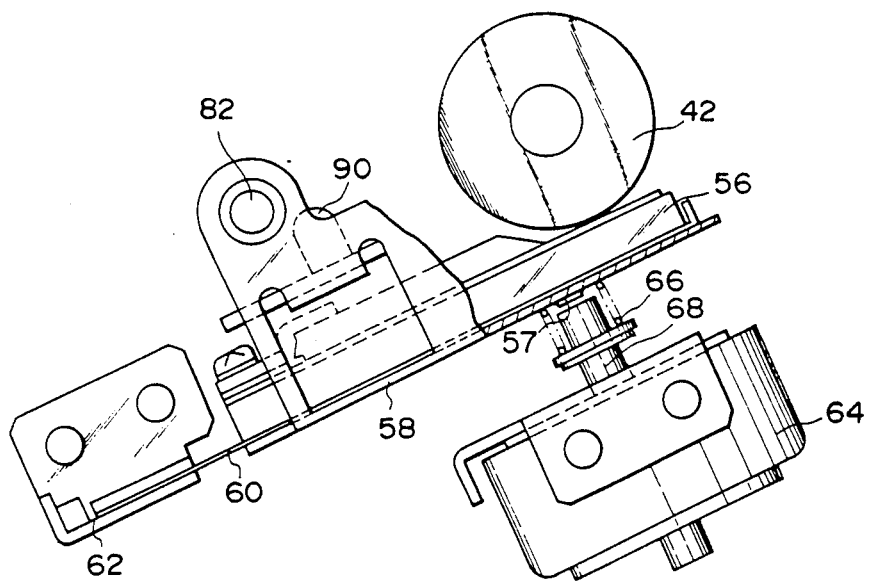
FIG. 12 and FIG. 13 are side views showing a thermal head separating and contacting mechanism of the printer shown in FIG. 1.
Figure 13:
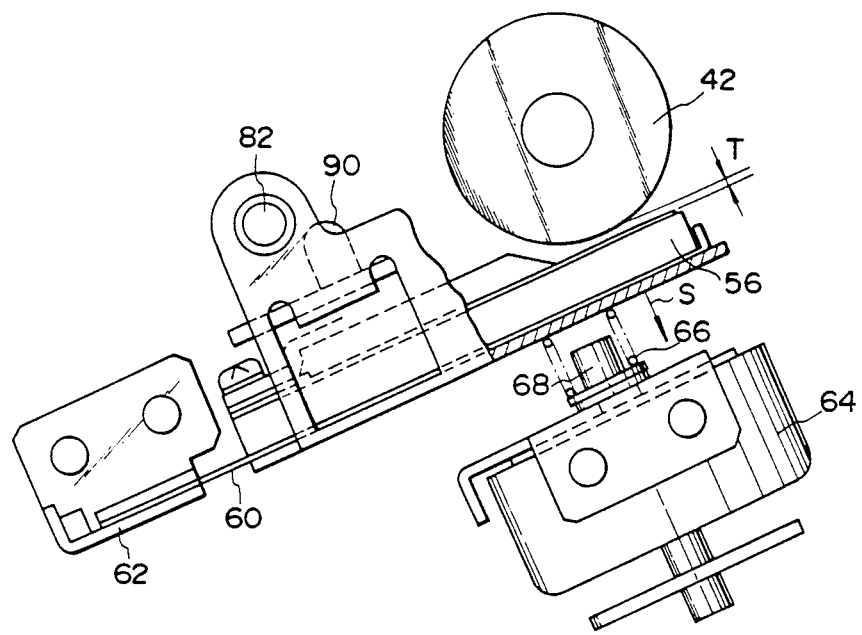

When the electromagnet 64 is in the ON state (energized state), the head 56 is urged to the platen 42 against the urging force of the coil spring 60 under the pressure adapted for thermal transfer as shown in FIG. 12. When the electromagnet 64 is in the OFF state (deenergized state), the head 56 is urged to the plunger 68 of the electromagnet 64 by the urging force of the coil spring 60, as shown in FIG. 13. Thus, the head 56 is moved toward the direction of an arrow S, and an interval T is formed between the platen 42 and the head 56. Consequently, when the paper P is reversely fed (in the case where the paper is returned when the second color is printed), the returning operation of the paper P is not disturbed by the interval T.

Figure 14:
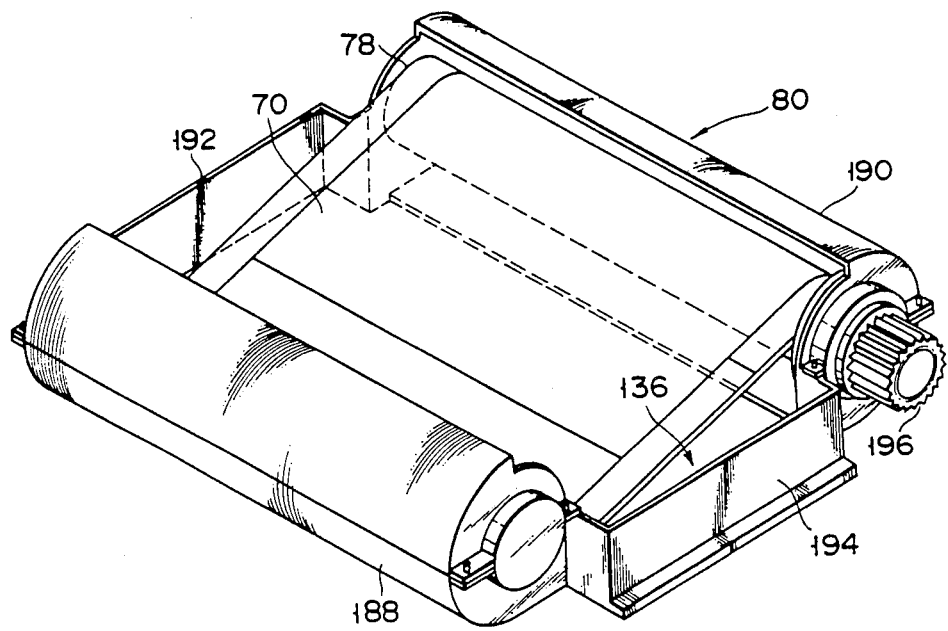
FIG. 14 is a perspective view of the ribbon cassette.

The ribbon cassette 80 will be described in more detail with reference to FIG. 14. This cassette 80 includes a case 186 for integrally containing the winding cores 72, 78. The cassette 80 conveys the ribbon 70 from the core 72 (feeding core) to the core 78 (winding core) in one direction. The case 186 has a containing unit 188 for containing the core 72, a containing unit 190 for containing the core 78, and a pair of supporting plates 192, 194 for coupling the two containing units 188, 190 to form the exposing space 136 of the ribbon 70 between the containing units 188 and 190.

The ribbon 70 is engaged in an S shape between the cores 72 and 78 to cross the line for coupling the centers of the cores 72 and 78. Consequently, when the cassette 80 is mounted on the body 12 of the printer, the ribbon 70 can be closely contacted with the platen 42. A gear 196 is provided integrally on one end of the core 78. When the gear 196 is mounted on the printer 10, the gear 196 is engaged with the coupling 164. A spring (not shown) for always urging one end of the core to the other end is provided in the containing unit 188 to always operate the brake at a predetermiend force on the core 72 so that the ribbon 70 does not slacken. Therefore, a brake, due to the frictional force with the spring, is operated on the core.

Figure 15:
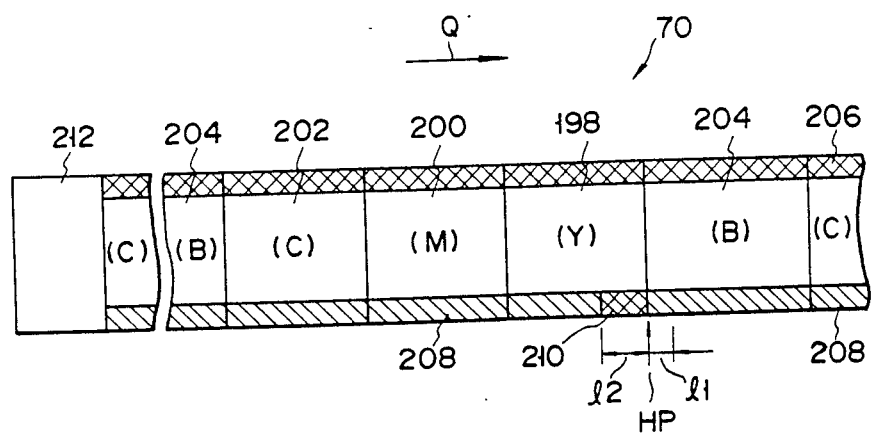
FIG. 15 is a plan view of the ribbon contained in the ribbon cassette shown in FIG. 14.

The ribbon 70 contained in the ribbon cassette 80 will be described with reference to FIG. 15. Ink units 198, 200, 202, 204 of yellow (Y), magenta (M), cyan (C) and black (B) are sequentially arranged along the feeding direction Q (in the direction designated by an arrow) on the ribbon 70. The ink units 198 to 202 of yellow, magenta, cyan have an area slightly larger than A6 size (JIS), and the ink unit 204 of black has a length longer by $l_1$ than those of the ink units 198 to 202. This length $l_1$ is a space necessary as a marginal portion when the paper P is cut by the cutter 105 after the transfer is finished, i.e., the length $l_1$ is slightly longer than the interval between the roller 104 and the cutter 105 shown in FIG. 3. A light interrupting portion 206 is provided at one side of one end, along the feeding direction, of the ribbon 70, and a light transmitting portion 208 having a transparent member is provided at the other side of the other end. When the cassette 80 is mounted in the printer 10, the portions 206, 208 are disposed between the light emitting element 90 and the photoreceptor 92 of the ribbon detecting mechanism 88. Further, a yellow indicator 210 having light interrupting ink is provided in the length $l_2$ from the boundary to the black ink unit 204. This length $l_2$ is substantially equal to the interval between the head 56 and the ribbon detecting mechanism 88. Moreover, a transparent portion 212 which is not entirely covered with ink is formed at the end of the ribbon 70.

The thicknesses of the inks coated on the ink portion 198, 200, 202, 204, the light interrupting portion 206, the light transmitting portion 208, and the yellow indicator 210 are uniform.

Figure 16:
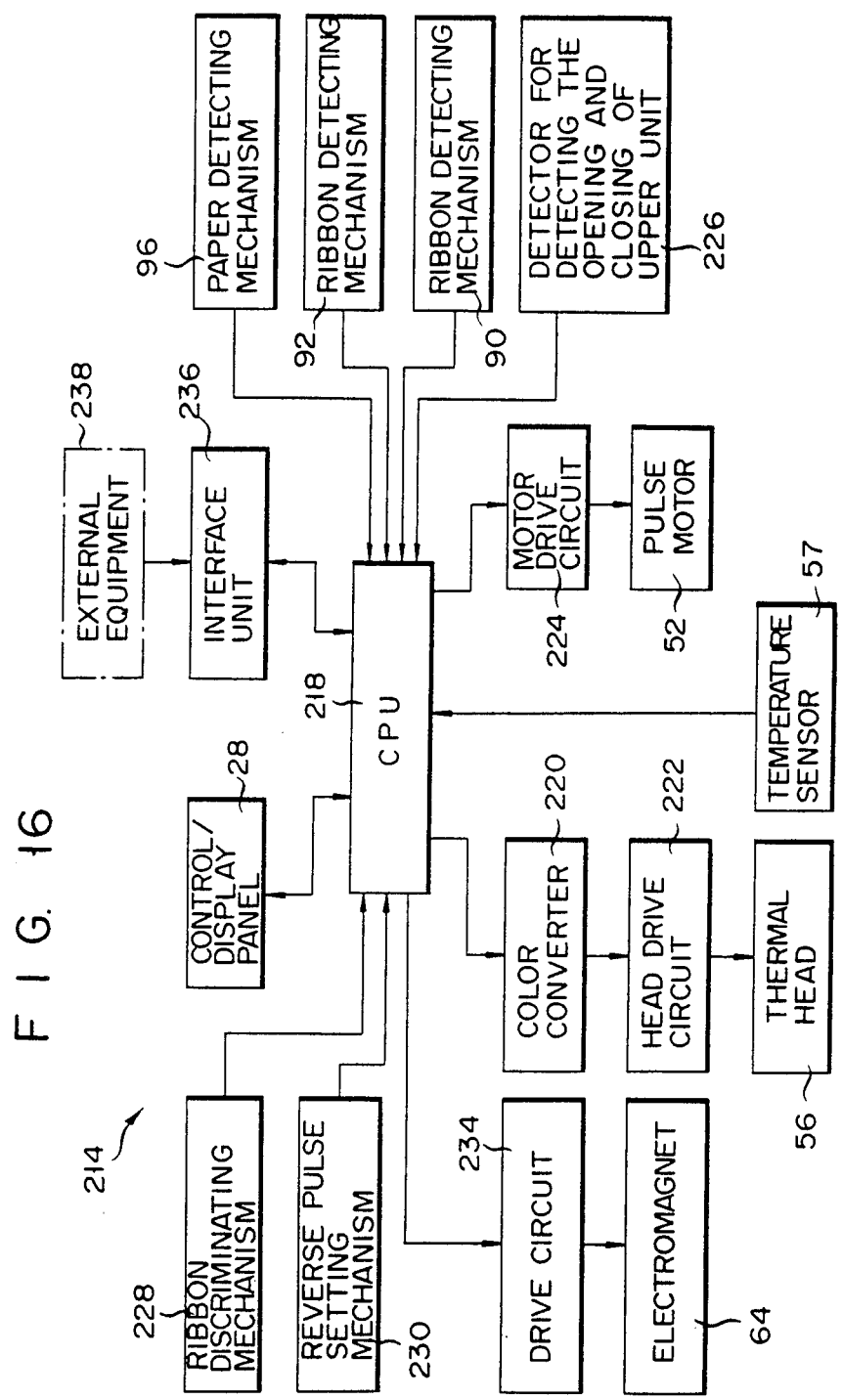
FIG. 16 is a block diagram showing a control of the printer shown in FIG. 1.

A control mechanism 214 of the printer 10 will now be described in detail with reference to FIG. 16. The mechanism 214 is formed on a substrate 216 (FIG. 3) provided on the body base 54.

A CPU 218 is provided in the mechanism 214 to control the drive of the entire printer 10.

The thermal head 56 is connected sequentially through a color converter 220 for selecting the color of the ribbon 70 in response to the image to be formed and a head drive circuit 222, and the pulse motor 52 is connected through a motor drive circuit 224 as a common drive source for feeding the paper P and the ribbon 70 to the CPU 218. Further, the paper detecting mechanism 96, the ribbon detecting mechanism 88, the control panel 28, and an opening and closing detector 226 for detecting the opening and closing of the upper unit 16 are connected to the CPU 218. In addition, a discriminating mechanism 228 for detecting the type of mounted ribbon, a reverse pulse setting mechanism 230 formed of a DIP switch for deciding the amount of the paper to be returned, a temperature detector 232 for detecting the abnormal temperature of the head 56, and a drive circuit 234 for driving the electromagnet 64 are connected to the CPU 218. Furthermore, external equipment 238 such as a computer and/or a word processor are connected through an interface unit 236 to the CPU 218.

When a record command is applied from the external computer or the word processor 238, the printer is operated, and the image is recorded or printed on the paper P. In other words, the motor 52 is driven by the record command, the paper P and the ribbon 70, which are in close contact with each other, are fed at the same speed in the same direction, and thermal recording is started by the head 56. In this case, the ink on the ribbon 70 is thermally melted by the head 56, and transferred to the paper P. Thus, an image is formed on the paper P.

Figure 18:
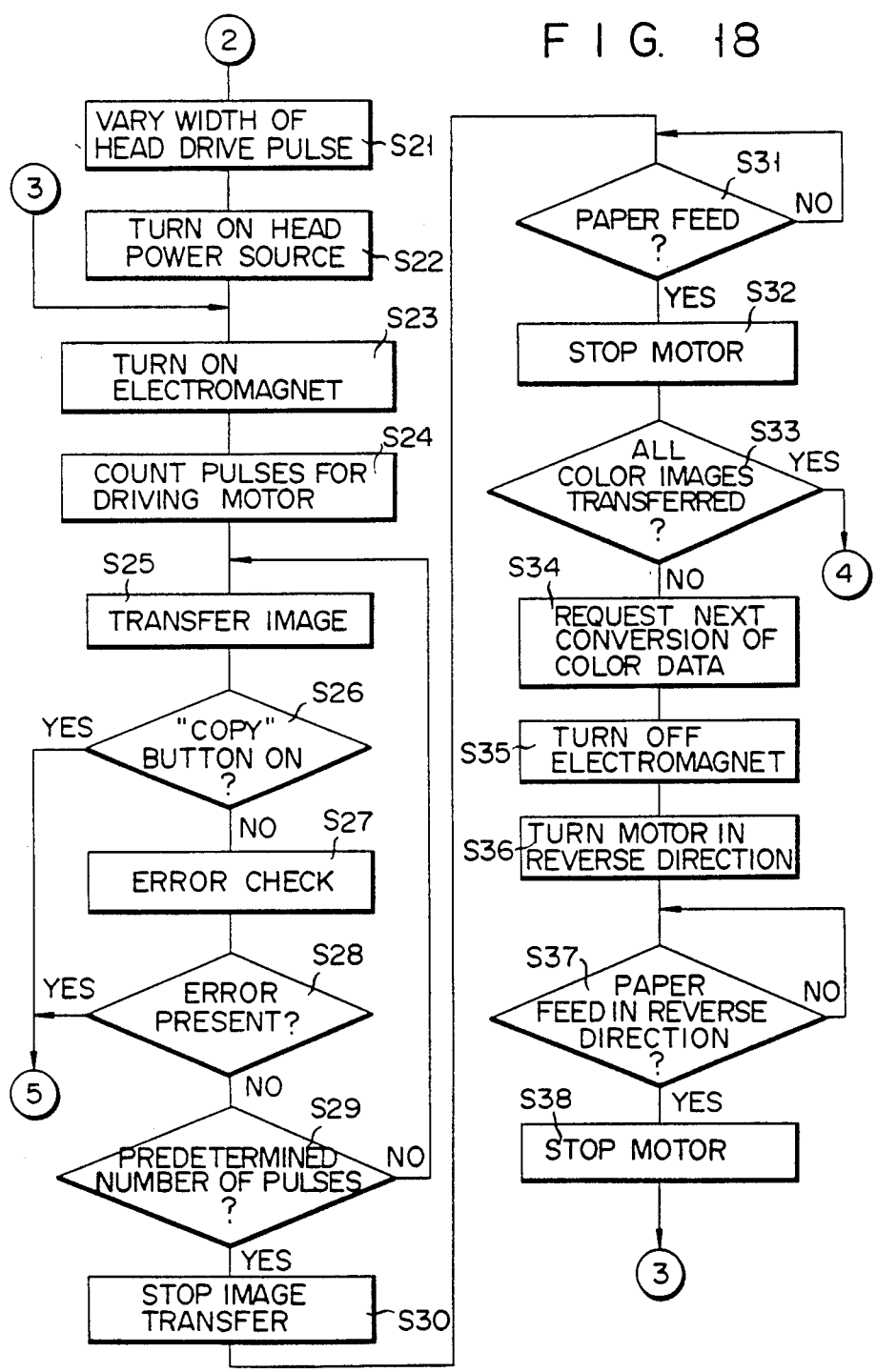
Figure 19:
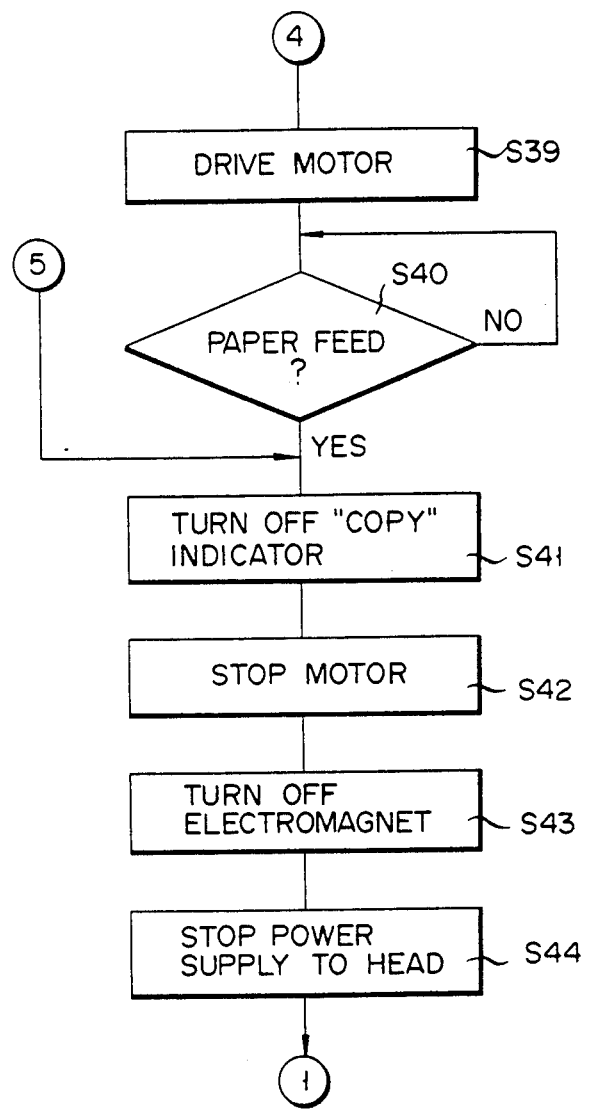

Now, the operation of the printer will be described with reference to FIGS. 17 to 20. FIGS. 17 to 19 show a series of controlling operations of the printer. As shown in FIG. 17, when the power source is first turned ON, in the CPU 218 having a microcomputer, various input ports are initialized as shown in step S1. Then, the preset type of ribbon 70 is read out and set in the discriminating mechanism 228 in step S2. Subsequently, the amount of the paper P to be returned, which was set in the setting mechanism 320, is read out and set in step S3. This returning amount corresponds to the number of drive pulses of the motor 52 necessary to feed the paper P to the transfer starting position after the transfer of one color is finished. Thereafter, a home position HP (the rear end of the black ink unit 204) of the ribbon 70 shown in FIG. 15 is detected in step S4. In other words, it is judged whether the output signals of the two ribbon detectors 90, 92 are both low level signals or not. As a result, when both are low level signals, the control is shifted to step S8, the motor 52 is stopped, and the electromagnet 64 is deenergized. When the output signal of the detector 90 is a high level signal, the motor 52 is driven in step S5, the electromagnet 64 is energized, and the ribbon 70 is fed together with the paper P. Thereafter, an error check is performed in step S6. In the error check, it is processed by a subroutine shown in FIG. 20.

Figure 20:
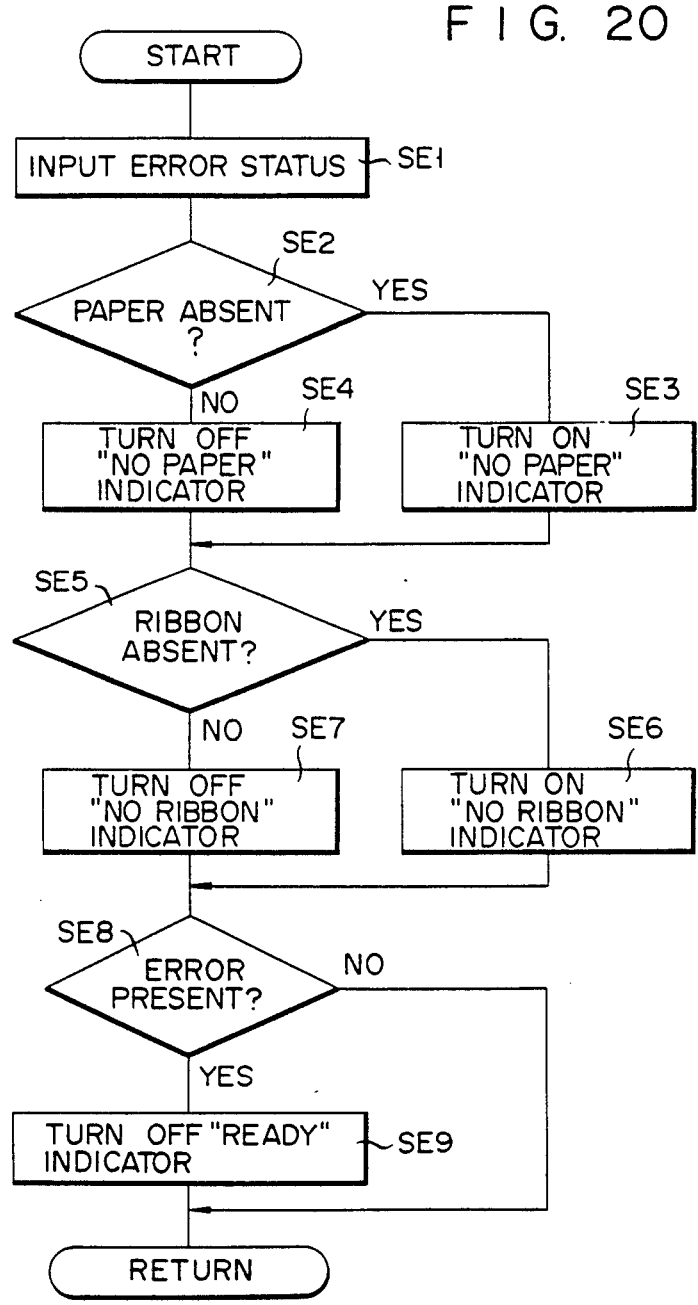
Figure 21:
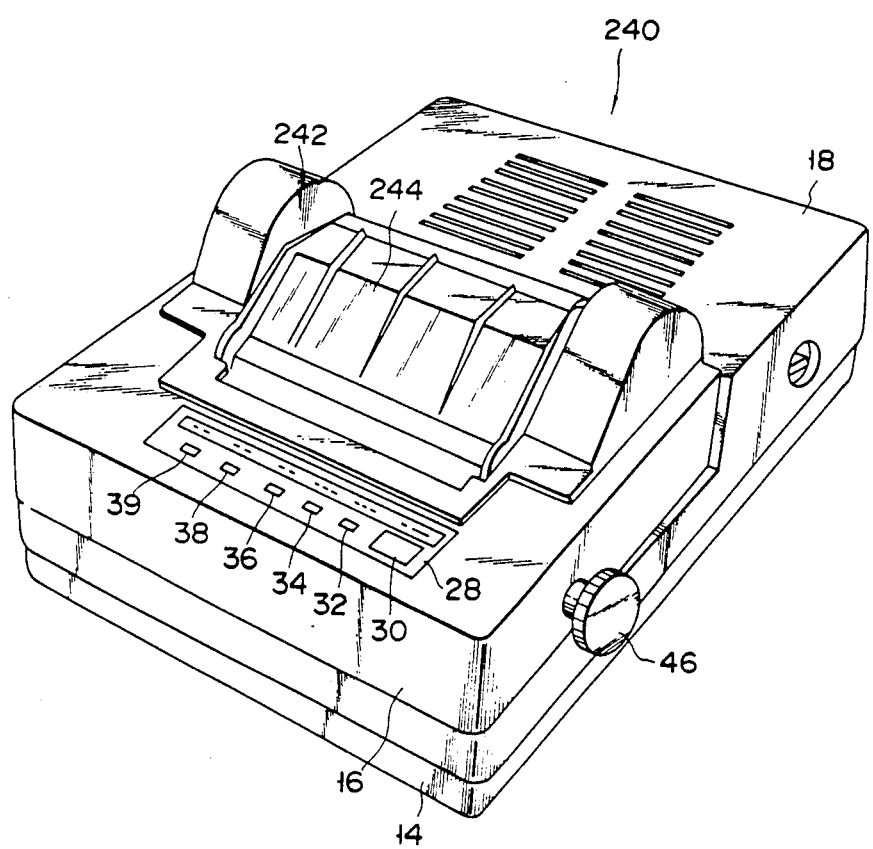
FIG. 21 is a perspective view of a printer according to another embodiment of the present invention.
Figure 22:
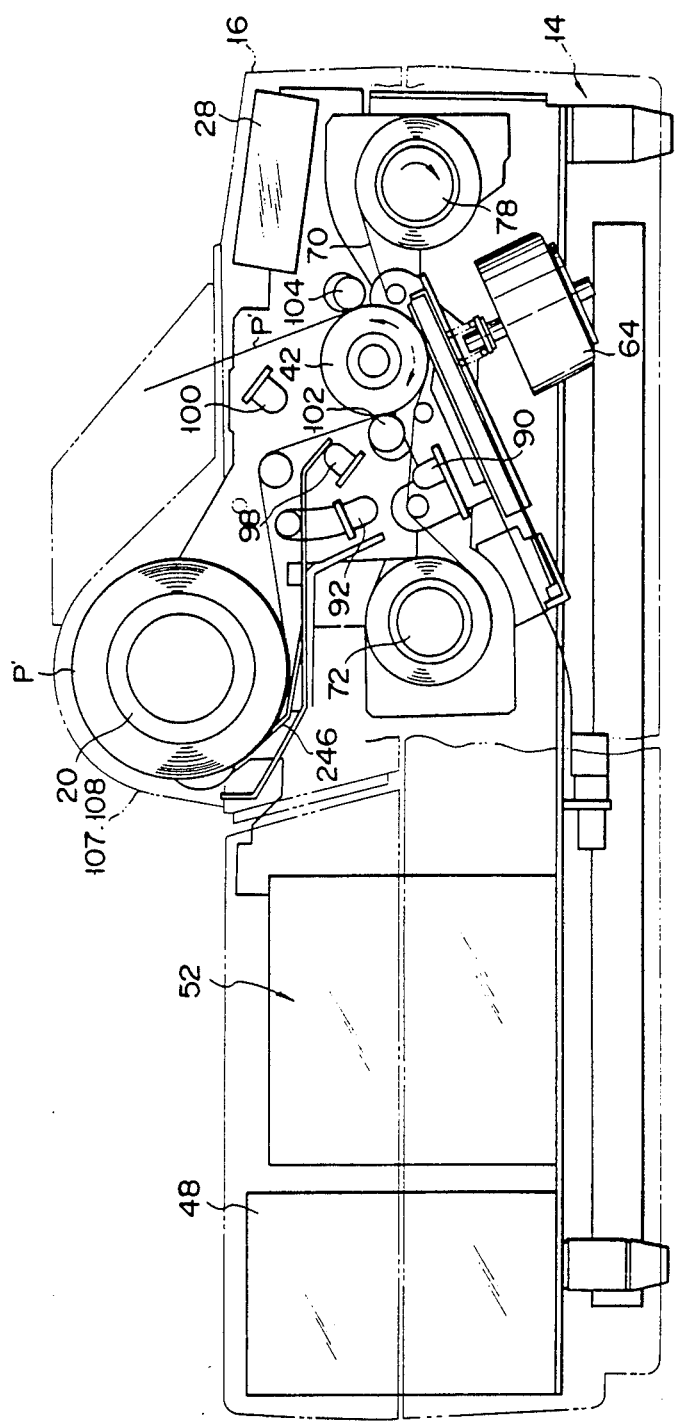
FIG. 22 is a schematic side view showing an internal mechanism of the printer shown in FIG. 21.

The error check will be described in detail with reference to FIG. 20. In step, SE1, the error status formed of the output signals of the detectors 90, 92, 96 is first read out. This error status is stored, for example, in a register, and when the ribbon 70 or the paper P is wasted out or absent, the corresponding bit of this register (hereinafter referred to as "error indication") becomes "1". The absence of the paper P is detected by the fact that the output signal of the detector 96 becomes a high level signal, and the absence of the ribbon 70 is detected by the fact that both output signals of the detectors 90, 92 are high level signals. When the error status is thus read out, whether the paper P is absent of not is judged in step SE2. As a result, when the paper P is absent, the no paper indicator of the control panel 28 is turned ON in step SE3, while when the paper P is present, the no paper indicator is turned OFF in step SE4. Then, whether the ribbon 70 is absent or not is judged by the error status. As a result, when the ribbon 70 is absent, the no ribbon indicator 36 of the control panel 28 is turned ON in step SE6, while when the ribbon 70 is still present, the no ribbon indicator 36 is turned OFF in step SE7. Subsequently, whether the error indication "1" is present or not is judged in step SE8, when absent, the control is returned to the main routine as it is, while when present, the ready indicator 39 (preparation complete indicator) of the panel 28 is turned OFF, and the control is returned to the main routine.

On the other hand, after the error check is performed in step S6 of FIG. 17, whether the error indication is present or absent in the error status is judged in step S7, when absent, the control is shifted to the step S4, and the home position HP of the ribbon 70 is detected. When error indication is present, the motor 52 is stopped in step S8, and the electromagnet 64 is deenergized. Thereafter, the error check is again performed in step S9, and whether the error indication is present or absent is judged in Step S10. Consequently, when the error indication is present, the steps S9 and S10 are repeated until the no paper or no ribbon state is eliminated, while when the error indication is absent, the temperature data of the head 56 is read out by the detector 232 in step S11. Whether the temperature data is a predetermined value or higher or not is judged in Step S12. When it is at the predetermined value or higher, the ready indicator 39 of the panel 28 is turned OFF in step S13, and the control is then shifted to the step S9, while when its lower, the ready indicator 39 is turned ON. Then, whether the copy button 30 of the panel 28 is pressed or not is judged in step S15, when it remains OFF, the control is shifted to the step S9, and set to the standby state, while when it is turned ON, the copy indicator of the panel 28 is turned ON in step S16. Subsequently, the heading of the yellow ink unit 198 of the ribbon 70 is executed in steps S17, S18. In other words, the motor 52 is driven, the electromagnet 64 is energized and the ribbon 70 is fed together with the paper P in step S17. In step S18, whether the output signal of the detector 90 of the detectors 90, 92 is varied from a low to a high level signal or not is judged. As a result, when its not varied, the ribbon 70 is continuously fed, while when it is varied, in step S19, the motor 52 is stopped, and the electromagnet is deenergized. Subsequently, the temperature data of the head 56 is read out by the detector 232 in step S20, the pulse axis of the drive pulse of the head 56 is varied on the basis of the temperature data in step S21, and control for not supplying more power to the head 56 than is necessary is executed. Thereafter, in step S22, the power source of the head 56 is turned ON, and the electromagnet 64 is energized in step S23. Then, in step S24, the motor 52 is driven to feed the paper P and the ribbon 70, and the number of pulses for driving the motor 52 is counted by a counter (not shown). Thereafter, in step S25, the transferring operation using the yellow ink unit 198 is first performed on the basis of the data fed from the external device 238. In other words, the data of A6 size represented, for example, by the color signals R (red), G (green) and B (blue) of the light supplied from the external device 238 is stored in a memory (not shown) of the interface unit 236. The data stored in this memory is converted to the signal corresponding to the yellow of the ink on the basis of the convertion table stored in a ROM (not shown) in the color converter 220. Then, in step S26, whether the copy button 30 is again pressed or not is judged. When pressed, the control is shifted to step S41 to be described in detail later, and the transfer is stopped. On the other hand, when not pressed, in step S27, the above-described error check is performed, and whether the error indication is present or not is judged in step S28. As a result, when present, the control is shifted to the step S41 to be described later, while when absent, in step S29, whether the number of pulse signals for driving the motor 52 reaches a predetermined value (the number of pulses necessary to feed the paper P) or not is judged, when not reached, the control is shifted to the step S25. When, on the other hand, if it is reached the transfer is finished in step S30, and in step S31, the paper P and the ribbon 70 are fed the predetermined distance. This distance corresponds to that, for example, from the transfer finishing position of the yellow to the transfer starting position of the magenta, and when this feeding is completed, the motor 52 is stopped in step S32. In step S33, whether the transfers are finished in all colors or not is judged, when they are not finished a conversion request for the next color data is fed to the interface unit 236 and the color converter 220, in step S34. Thereafter, in steps S35 to S37, only the paper P is returned to the transfer starting position. In other words, in step S35, the electromagnet 64 is deenergized, in step S36, when the motor 52 is reversely rotated, the ribbon 70 remains still, and only the paper P is reversely fed. In step S37, the motor 52 is driven the number of pulses set by the switch 230, and whether the reverse feeding of the paper P is finished or not is judged. When its not yet completed, the operation is repeated, while when it is completed the motor 52 is stopped, in step S38, and the control is shifted to step S23. Subsequently, the next color transfer operation is similarly executed, and whenever the transfer operation of one color is finished, only the paper P is returned to the transfer starting position, and the inks of magenta, cyan and black are superposed and transferred.

As described above, when all colors are transferred completely, the control is shifted from the step $S_{33}$ to step $S_{39}$. In the step S39, as shown in FIG. 19, the motor 52 is driven, the paper P is fed together with the ribbon 70. In step S40, whether the feeding distances of the paper P and the ribbon 70 reach the distance $l_1$ shown in FIG. 15 or not is judged. When not reached, the paper P and the ribbon 70 are fed continuously. When they are reached, the copy indication becomes OFF in step S41, and the motor 52 is stopped in step S42. Further, in step S43, the electromagnet 64 is deenergized, and the head 56 is deenergized in step S44. Subsequently, the control is shifted to the step S9, and until the copy button 30 is pressed, the operations of the steps S9 to S15 are repeated, and the control moves into the standby state.

Another embodiment of the present invention will now be described with reference to FIG. 21 to FIG. 25. In this embodiment a printer 240 and the holder 22 for mounting the roll 20 wound with paper P are provided on an upper unit 16. Further, a detachable cover 242 and exhausted paper tray 244 are provided on the roll 20 and the holder 22. The other constructions are substantially the same as that of the previous embodiment, and the same reference numerals as in the first embodiment of the printer 10 denote the same parts in the second embodiment, thus a detailed description thereof will be omitted.

The roll 20 is held rotatably at both ends by the holder 22. Further, a leaf spring 246 is provided as brake means for preventing unintentional rotation of the roll 20. The spring 246 is disposed under the roll 20 and is pressed by the weight of the roll 20, and is fixedly secured at one end but is free at the other end.

Figure 24:
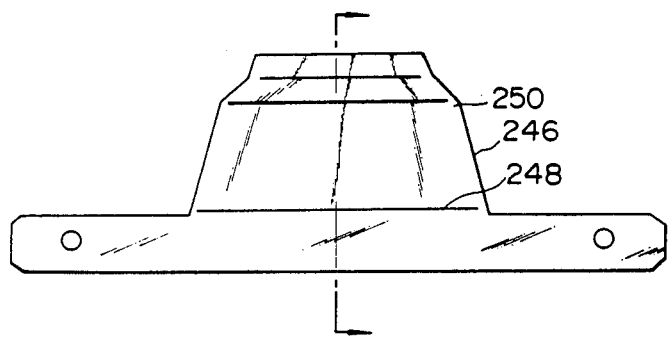
FIG. 24 is a plan view of a leaf spring used for the rolled sheet mounting unit shown in FIG. 20.
Figure 25:
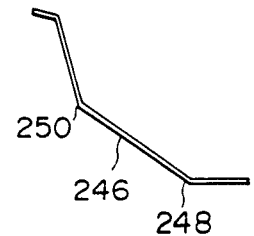
FIG. 25 is a sectional view, taken along the line X—X of the leaf spring shown in FIG. 24.
Figure 26:
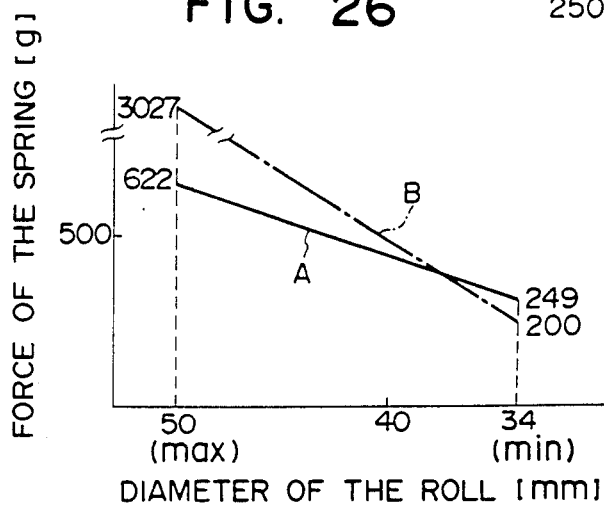
FIG. 26 is a diagram showing the spring characteristic of the leaf spring shown in FIG. 24.

The spring 246 is, as shown in FIGS. 24 and 25, constructed to have two bent portions 248 and 250, so that it has a spring characteristic designated by a solid line (A) in FIG. 26, and does not largely vary in spring force as compared with the conventional spring having one bent portion, even if the diameter of the roll varies as designated by a one-dotted chain line (B). Therefore, even if the winding diameter of the roll alters, a relatively stable urging force is applied to the roll 20.

Figure 23:
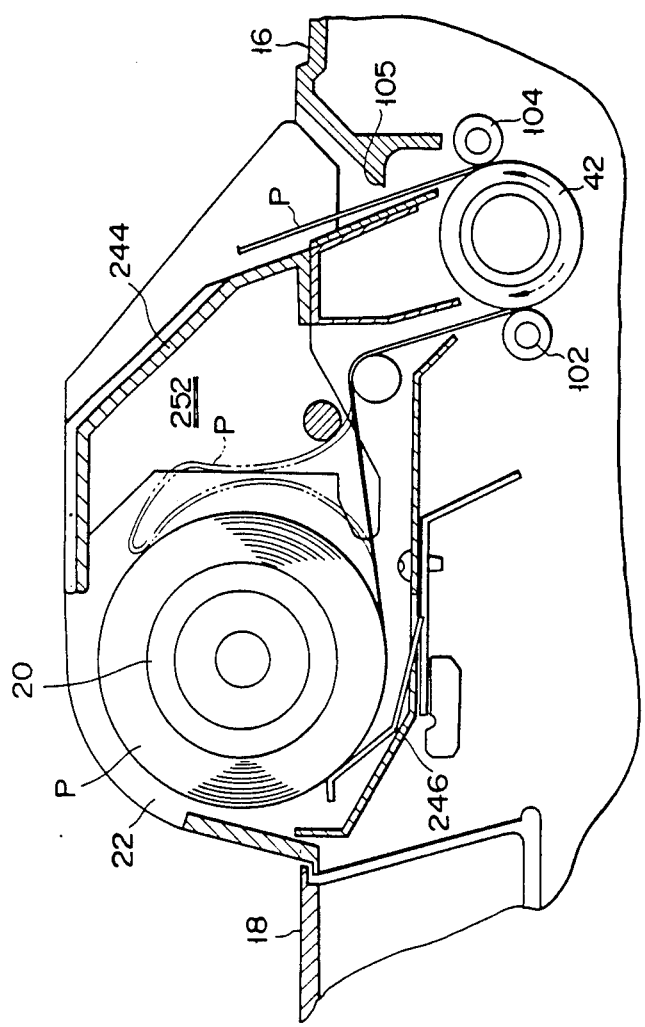
FIG. 23 is a sectional view showing a rolled sheet mounting unit of the printer shown in FIG. 20.

Further, the roll 20, held rotatably by the holder 22, is restricted in unintentional rotation by the pressure of the end of the spring 246 on its peripheral surface as shown in FIG. 23, that is, the paper P is not fed by inertial force.

Moreover, as shown in FIG. 23, a space 252 is formed between the tray 244 and the roll 20 to contain the returning portion of the paper P (designated by a two-dotted chain line in FIG. 23) when the paper P is reversely fed.

The present invention is not limited to the particular embodiments described above. Various other changes and modifications may be made within the spirit and scope of the present invention.

For example, in the embodiments described above, the holder 22 for holding the roll 20 is detachably mounted in the printer. However, the present invention is not limited to this particular construction, but may be secured to the body 12.

Further, in the embodiments described above, the hook lever for opening and closing the upper unit is provided on the front surface of the body. However, the present invention is not limited to this particular construction, but may be provided at the side of the body.

What is claimed is:

1. An image forming apparatus for forming an image, in response to an image signal, on a sheet supplied from a wound roll of sheets to a sheet conveyance path, comprising:

a body including a first body portion having a head responsive to said image signal, a second body portion rotatable with respect to said first body portion between at least a lowered and a raised position and including a platen, said platen defining at least a portion of said sheet conveyance path, and a third body portion disposed adjacent to said second body portion and secured to the first body portion, the second body portion covering said portion of the conveyance path when at said lowered position and exposing said portion of the conveyance path when rotated away from said first body portion to said raised position, the second portion defining a feeding port for feeding sheets to said portion of the sheet conveyance path and an exhausting port for exhausting sheets from said portion of the sheet conveyance path after said head forms an image thereon;

a ribbon cassette including a ribbon impregnated with ink; and a ribbon cassette holder, provided between the first body portion and the second body portion, for detachably supporting the ribbon cassette, said ribbon cassette holder being exposed between the first and second body portions when the second body portion is rotated with respect to the first body portion to said raised position.

2. An image forming apparatus as in claim 1 wherein said ribbon cassette holder is rotated with respect to the first body portion with rotation of said second body portion, and is slanted with respect to the first body portion when said second body portion is rotated to said raised position.

3. A printer comprising:

a lower casing;

means defining a paper conveyance path having an input end and an output end;

a rear upper casing, fixed to said lower casing, defining a first substantially planar surface terminating in a front edge, and further defining at least one projection extending from said first surface;

a front upper casing defining a second substantially planar surface terminating in a rear edge, said front upper casing journalled to said lower casing and rotatable between at least (a) a lowered position whereat said first and second surfaces are coplanar and said front and rear edges meet one another, and (b) a raised position whereat the planes between in which said first and second surfaces lie intersect at an acute angle, said front upper casing defining first and second slots, said first slot being in registry with said conveyance path input end of said second slot being in registry with said conveyance path output end at least when said front upper casing is at said lowered position, said front upper casing and lower casing enclosing said conveyance path defining means when said front upper casing is at said lowered position, at least a part of said conveyance path being exposed by a space formed between said lower casing and said front upper casing when said upper casing is at said raised position;

roll holding means for rotatably retaining the spindle of a roll of paper, said roll holding means including means defining plural flat edges for resting on said first surface under the force of gravity and means defining a recess mating with said projection when said roll holding means is rested on said first surface and;

ribbon carriage means, rotatably journalled to said lower casing and coupled to rotate together with said upper casing, said carriage means for retaining a ribbon cartridge.

* * * * *